Dec. 1, 1942.    J. R. BENFORD ET AL    2,303,906
POLARIZED LIGHT COMPENSATING SYSTEM
Filed Dec. 1, 1941
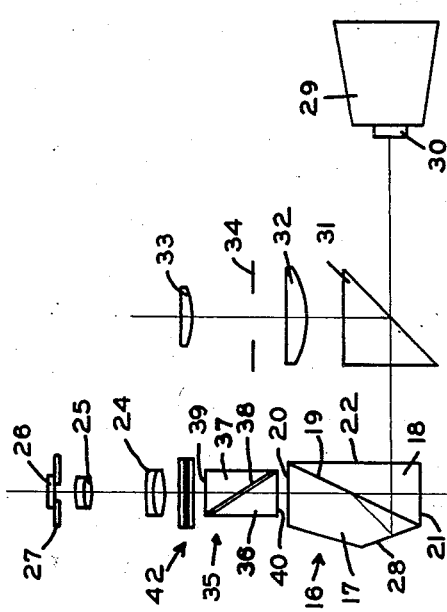
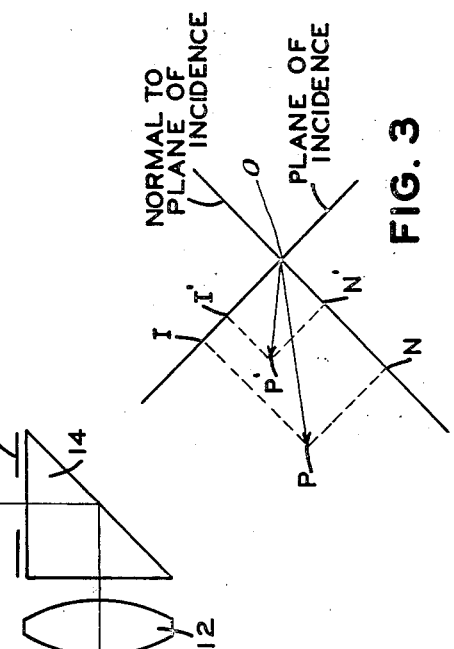
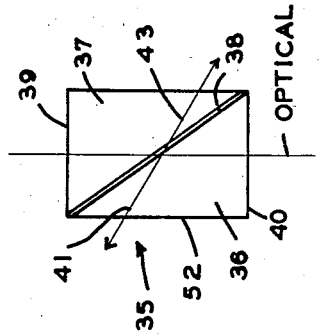
JAMES R. BENFORD
ARTHUR F. TURNER
INVENTORS Patented Dec. 1, 1942

2,303,906

UNITED STATES PATENT OFFICE 2,303,906

POLARIZED LIGHT COMPENSATING SYSTEM

James R. Benford, Rochester, and Arthur F. Turner, Brighton, N. Y., assignors to Bausch & Lomb Optical Company, Rochester, N. Y., a corporation of New York Application December 1, 1941, Serial No. 421,158

6 Claims. (Cl. 88—39)

Our invention relates to optical instruments and more especially to an optical system used therewith to permit examination of an object by polarized light.

One object of this invention is to provide a new and improved optical system which permits vertical illumination of the object in instruments such as microscopes, particularly microscopes of the metallographic type. Another object is to provide novel means to compensate for rotation of the plane of polarization introduced by a specimen into plane polarized light which is used to illuminate the specimen while yet another object is to devise improved means to compensate for ellipticity introduced by a specimen into an illuminating beam of polarized light.

A further object is to provide in an optical instrument used to determine the optical constants of an object, the combination of rotation compensating means with phase retardation means, the former means being of a nature capable of producing a variable rotation of the plane of polarization of a plane polarized light beam which illuminates the objects and which passes through the instrument and the latter means being of a character adapted to provide a variable degree of ellipticity in the polarized beam.

A still further object of our invention is to provide rotation compensating means and elliptical compensating means in a vertical illuminating system of the type having an optical element which serves as both a polarizer and an analyzer for polarizing an illuminating beam in its passage therethrough to a specimen and to analyze such beam on its return to the optical element after its reflection from the specimen.

With these and other objects in view which may be incident to our improvements, the invention consists in the parts and combinations to be hereinafter set forth and claimed, with the understanding that the several necessary elements comprising our invention may be varied in construction, proportion and arrangement without departing from the spirit of the invention or exceeding the scope of the appended claims.

In order to make our invention more clearly understood, we have shown in the accompanying drawing means for carrying the same into practical effect without limiting the improvements in their useful applications to the particular constructions which, for the purpose of explanation, have been made the subject of illustration.

In the drawing:

Figure 1 is a diagrammatic illustration of an optical system used with our invention.

Figure 2 is an enlarged diagrammatic view of an element of the optical system disclosed in Figure 1.

Figure 3, also a diagrammatic view, illustrates the direction of polarization of a light beam after its passage through a part of the optical system of Figure 1.

It is now understood that optically anisotropic substances and surfaces can be expected to affect plane polarized light in a number of different ways upon its reflection therefrom, in the case where such substances and surfaces are opaque, as well as upon its passage through transparent substances and surfaces of this character. These changes introduced into the plane polarized light include a rotation of its plane of polarization or its conversion into elliptically polarized light or a combination of both of these effects.

While rotation and elliptical compensating devices are both known, the former possess certain defects which preclude their successful use in some types of microscopic analysis. So far as we are aware, the art has failed to supply compensating means of both characters in a vertical illuminator such as that which has a full aperture polarizing illuminating system and which is of a type commonly used with a metallographic microscope.

The construction of a polarizing vertical illuminator like that just mentioned makes it necessary that any compensator device used in conjunction with it be traversed by both the illuminating beam and the reflected beam. In operation, the illuminator directs a beam of polarized light through the full working aperture of an objective, (that is to say the instant aperture used for an observation) and onto a specimen from which the beam is reflected and returned through the full working aperture of the objective to the vertical illuminator device. This type of illuminator is particularly useful in the observation of opaque material. Here it is impossible, from a practical standpoint, to study the specimen by means of a transmitted beam even where the specimen is in the form of an extremely thin section. Hence the reflected beam becomes the preferred source of information on the optical constants of the object being examined.

As already indicated, rotation compensators now known possess certain inherent defects which prevent their use with a vertical illuminator like that mentioned. For example, rotation compensators of crystal, such as quartz, or of liquid, such as turpentine, are ineffective when traversed by the same beam in opposite directions since their rotation of the light vector in the incident or illuminating beam would be nullified by their equal and opposite rotation of the light vector in the reflected beam. On the other hand, rotation of the plane of polarization by a magnetic field would require a magnetic coil so powerful as to be impractical. Furthermore, interreflections set up in an inclined glass plate give rise to multiple images in the field of view which preclude the use of such means as a practical compensator, especially where the compensating means is required for the determination of minute rotational effects.

In providing novel apparatus having compensating means to correct for rotation of the plane of polarization and for any ellipticity introduced in the beam of polarized light by a specimen which it illuminates, we make use of a vertical polarizing illuminator of the general design shown in U. S. Patent No. 2,074,106, issued March 16, 1937 to L. V. Foster. The optics and construction of our apparatus is disclosed in our drawing wherein similar reference characters are employed to indicate like parts in the different views. As shown in Figure 1, the apparatus comprises condensing lenses 10, 11 and 12 employed to direct light rays in a horizontal direction from a source 13 to a prism 14 which reflects these rays vertically upward through a diaphragm 15 to the illuminator prism 16.

Illuminator prism 16, which serves as a polarizer and an analyzer, is formed of two pieces of calcite or other birefringent material 17 and 18 cemented at the interface 19. The prism 16 is arranged so that its ends 20 and 21, which are parallel to each other, are normal to the optical axis of the instrument. Light entering prism 16 is polarized at the interface 19, the extraordinary ray being transmitted through the prism in the direction of the optical axis of the instrument while the ordinary ray is reflected from the surface 19 and is absorbed by a suitable light absorbing coating on the face 22 of the prism.

Means adapted to compensate for any rotation of the plane of polarization of the beam of plane polarized light emergent from the prism 16, are mounted directly above the latter. These means comprise a prism 35 generally formed of the wedge shaped elements 36 and 37 of some transparent material, usually glass, of like refractive index. The inclined surfaces of elements 36 and 37 are maintained in parallel relation. Either of such surfaces carries a substantially transparent layer or film 38 of material which has a refractive index different from that of the prism elements. The surface of layer 38 and the inclined surface of the element opposite thereto are suitably cemented together with a cement which has an index of refraction substantially equal to that of the material forming the prism elements. The only requirements in regard to the refractive indices of materials used in the compensator prism 35 are that the elements 36 and 37 have matched indices and that layer 38 has an index which differs therefrom by being of either higher or lower magnitude.

By reason of the just described construction, the ends 39 and 40 of the prism elements will be parallel to each other. Whether or not elements 36 and 37 are of wedge shape is immaterial so long as their faces which are adapted to be joined to the layer 38 make substantially equal acute angles with their respective end portions 39 and 40.

Compensator prism 35 is located above the illuminator prism 16 so that the ends 39 and 40 of the former are normal to the optical axis of the instrument. Consequently the inclined surfaces of the elements 36 and 37 and also the layer 38 between them will be angularly disposed with respect to the optical axis. In order to permit the compensator prism 35 to produce a variable rotation of the plane of polarization of polarized light which is passed therethrough, it is so mounted that it may be rotated about the optical axis of the instrument.

Layer 38 usually has an area substantially equal to that of each inclined or hypotenuse surface of the prism elements 36 and 37 and is given a uniform optical thickness which generally approaches a value equal to one quarter the wavelength of some component of light usually chosen from the visible spectrum. Where we refer in the specification and claims to a quarter wave film, we mean a film having a geometrical thickness which substantially satisfies the following well known equation:

$$d = \frac{\lambda}{4} \times \frac{1}{n_F \cos a_2}.$$

Where $d$ is the geometrical thickness of the film, $\lambda$ is the wavelength of light measured in vacuum, $n_F$ is the refractive index of the film, and $a_2$ is the angle of refraction in the film as calculated from the equation of Snell's law that $n_G \sin a_1 = n_F \sin a_2$, the term $n_G$ being the refractive index of the glass and $a_1$ being the angle of incidence on the film.

While the thickness noted is that which is considered the most desirable for a reflectance film, it should be observed that films of a thickness equal to any small odd multiple of a quarter wavelength may be employed in the practice of our invention. For the sake of clarity in the drawing, the thickness of the layer 38 has been exaggerated.

Under one practice, layer 38 is a reflectance or interference film of the type formed by depositing a metallic salt or oxide by a high vacuum evaporation process on the inclined face of one of the prism elements, the inclined face of the other prism element being cemented to the film as heretofore noted. While any suitable transparent material may be used to form layer 38, media which are non-absorbing as to light are to be preferred. We have had considerable success in the use of evaporated layers of tin oxide and zinc sulfide.

Where elements 36 and 37 are of glass, the layer 38 may also be formed by leaching out acid soluble glass forming oxides to leave a surface film rich in silica on the inclined surface of one of these elements. Under such circumstances, both elements 36 and 37 are cemented together in a manner like that already described. Layer 38 may be formed in many other ways and by the use of many other materials so long as they fulfill the requirements as to refractive index and thickness previously mentioned. For example, a glass layer answering these requisites would fall within the scope of the invention. Also contemplated by the invention are films formed by the well known practice of spraying substances such as titanium tetrachloride, silicon tetrachloride and the like on glass or other suitable transparent material.

Light incident on an inclined transparent surface is partially transmitted through the surface and is partially reflected therefrom. Thus a part of the illuminating beam which enters the compensator prism 35 will be transmitted through the layer 38 to emerge through the end 39 of the element 37 while another portion will be reflected at layer 38 through the prism element 36. This reflected portion, indicated by the arrow line 41 in Figure 2, may be lost through the side 52 of the compensator prism or it may be absorbed by a light absorbing coating provided on such side.

Where the light incident on an inclined transparent surface is plane polarized as is the case of the illuminating beam, the plane of vibration of the transmitted component is swung toward the plane of incidence. This action is due to the transmission coefficient of the surface being greatest for light vibrating in the plane of incidence and least for light vibrating normal to the plane of incidence. We utilize this well known principle in our invention to compensate for any rotation of the plane of polarization of the illuminating beam which is introduced by the specimen being examined. (While, as noted, the action of such a surface on plane polarized light is to cause its plane of vibration to be swung or rotated toward the plane of incidence, a surface of the described character acts on unpolarized light as an incomplete or partial polarizer.)

Each surface of an inclined glass plate will affect light which is incident to that surface in a manner similar to that just noted above. However, a glass plate gives rise to interface reflections which result in multiple images when a light ray is transmitted through opposite surfaces of the plate. At each interface reflection, the light undergoes an azimuth change so that the polarization of the multiple images is different from that of the direct image. These multiple reflections make a glass plate impractical as a precise compensator since they will appear prominently in the field view of an instrument with which the plate is employed, especially where the field of view is dark as when observation is conducted between crossed Nicols.

Obviously, multiple images will lead to confusion and preclude accurate work in instances where fine measurements are dependent upon the observed intensity of a single image. As an example, where multiple images are highly objectionable, one may consider the examination of an object under crossed Nicols to determine its optical constants.

While the rotation compensating means which we have disclosed will act on polarized and unpolarized light in a manner similar to a glass plate, it is distinguished therefrom by its ability to avoid formation of multiple images. It may be demonstrated, in accordance with the principles involving the interference of light, that no multiple images will be formed in the passage of a ray through a transparent body which has plane parallel front and back surfaces if the body has an extremely thin cross section. By a thin cross section is meant one which has a geometrical thickness comparable to a wavelength of light. That multiple images are avoided in this instance may be explained by the fact that the components reflected from the incident ray are so related to each other that they add up to form a resultant which may be treated as a single reflected ray. The same thing is true of the transmitted components of the incident ray in that they will form a resultant which may be treated as a single transmitted ray.

The suggestion that the disturbance due to multiple images may be avoided by providing a high reflectance film on one surface of a glass plate with or without a low reflectance film on the opposite surface has been found to be substantially valueless in practice. The terms "high" and "low" used in referring to a reflectance film, denote films which respectively have a higher and a lower refractive index than the index of the glass or other substance employed to form the prism elements 36 and 37. Our work has, however, led us to the discovery that the undesirable condition, just above mentioned, may be overcome where, as shown in the drawing, a reflectance film or layer is placed between the wedge shaped prism elements. Our construction, it should be noted, is able to obtain the desired preferential transmission and reflection of the polarized components of a beam of polarized light without the creation of ray components which could be expected to form multiple images.

The ability of the compensator prism 35 to rotate the plane of polarization of the illuminating beam which emerges from the polarizer-analyzer 16 is in fact dependent upon the ability of the compensator prism to reflect one vibration component of the incident beam more copiously than the other. Rotation of the plane of polarization of the illuminating beam by the compensator prism 35 takes place in accordance with the relative positions of the plane in which the polarized light is vibrating and the plane of incidence on the layer 38. For example, the illuminating beam will be passed through the compensator prism 35 without rotation of its plane of polarization when its vectors are vibrating in a plane which is either parallel or normal to the plane of incidence. On the other hand, maximum rotation occurs when the light vector is incident in azimuth around 45°.

The compensator prism is said to be in its zero setting when it is in a position wherein it transmits the illuminating beam without change in azimuth of the beam. Obviously, rotation of the compensator prism 35 from its zero setting will effect a change in the position of the plane of incidence relative to the plane of vibration of the illuminating beam transmitted by the polarizer. Thus rotation of the plane of vibration of the illuminating beam will be mathematically related to the angular measure of the rotation of the compensator prism 35 from its zero setting.

The manner in which the compensator prism causes desired rotation of the plane of polarization of the illuminating beam will be understood with reference to Figure 3 which is a diagrammatic view employing vectors as an aid to illustrate the rotational effect. This view, taken from a position looking downwardly upon the end 39 of the compensator prism, shows the rotation of the illuminating beam as it ascends from the illuminator prism 16 through the compensator prism 35.

In Figure 3 the letter O represents the optical axis of the instrument, the line drawn through OP shows the plane in which the illuminating beam is vibrating on emergence from prism 16 while the distance OP represents the amplitude of this vibration and the lines drawn through OI and ON represent, respectively, the plane of incidence on the layer 38 of the compensator prism 35 and the normal to the plane of incidence. The component of OP which is parallel to the plane of incidence is given by the distance OI while the component normal to the plane of incidence is shown by the distance ON.

Inasmuch as a portion of the beam OP is lost by reflection at the reflectance layer 38, it will be evident that OP', the portion of the illuminating beam transmitted through the compensator prism, will be smaller than OP. At the same time, the transmitted components OI' and ON' which correspond to the incident components OI and ON will be in a proportion to each other which is different from the proportion which exists between the values of the components OI and ON. This condition is explained by the heretofore noted principles which pertain to the transmission and reflection of a light beam incident at an angle on a transparent surface and which hold that the beam component vibrating in a plane parallel to the plane of incidence on the surface will be more copiously transmitted than the component which is vibrating in a plane normal to the plane of incidence.

The just described difference in proportion between the two sets of components will cause the resultant OP' of the components ON' and OI' to be swung away from the plane of vibration of the beam OP. Since the resultant OP' is the portion of the illuminating beam transmitted by the compensator prism 35 and since the line OP' also represents the position of the plane of vibration for the beam OP', it will be apparent from Figure 3 that the plane of polarization of the illuminating beam emergent from the polarizer-analyzer prism 16 will be rotated by an angle POP'.

From a study of Figure 3 it will be apparent that a variable rotation of the plane of polarization of the illuminating beam will be obtained as the compensator prism 35 is rotated about the optical axis of the microscope. Inspection of Figure 3 will also show that the plane of polarization of the illuminating beam will remain undisturbed when the compensator prism is at zero position. To be noted is the fact that rotation of the plane of polarization will always be towards the plane of incidence. The latter condition will always hold true whether the beam is being transmitted through the compensator prism to the specimen or whether it is being returned through the compensator prism to the illuminator prism 16 after it has been reflected from the specimen. This is because the previously mentioned difference in proportion between the beam components will exist for either of the just described conditions, and will cause rotation to always occur in the same directional sense.

The amount of rotation introduced into a beam passing through the compensator prism 35 is dependent upon a number of factors besides the rotated position of the compensator prism with respect to its zero position. These include the refractive index of the prism elements 36 and 37, the refractive index of the layer 38, the thickness of the layer 38 and the wedge angle of the prism elements or the angle at which the layer 38 intersects the optical axis of the instrument. The effect of variation of factors of this nature are illustrated in the table which immediately follows.

| Refractive index of film | 1.34 | 1.90 | 2.37 |
|---|---|---|---|
| Refractive index of glass | 1.67 | 1.67 | 1.52 |

| | | | | |
|---|---|---|---|---|
| Angle of incidence | 0° | 0.0° | 0.0° | 0.0° |
| | 30° | 2.4° | 0.4° | 4.2° |
| | 45° | 9.3° | 1.1° | 10.8° |
| | 60° | D.T.R. | 3.9° | 22.1° |
| | 75° | D.T.R. | 17.8° | 33.7° |
| | 90° | D.T.R. | 0.0° | 0.0° |

The above table gives the maximum rotation of an opaque reflecting specimen which can be compensated by various combinations of films and glass prisms used in the construction of the rotation compensator 35 of Figure 1. This maximum compensatible rotation is approximately double the rotation obtained for a single passage of light through the compensator 35 since the beam will twice traverse the same when it is used in the manner shown in Figure 1. The table covers conditions wherein the refractive index of the film 38 is either greater or less than that of the prism elements 36 and 37.

It may be noted from an inspection of the table that an unusual case occurs when the index of the film is less than that of the prism elements in instances where the angle of incidence on the film is greater than the critical angle for the film index-glass index combination as calculated by Snell's law. Under these circumstances, total reflection would take place if the film were of sufficient thickness. However, with the thin film here employed, the reflection which occurs is not total but rather partial or degenerate total reflection, the latter term being abbreviated as D. T. R. Whereas D. T. R. conditions can be used in a rotation compensator, they are more adapted for employment in devices which are designed primarily as beam splitters and will not be referred to further in connection with the present invention.

The illuminating beam after transmission by the compensator prism 35 is directed through a phase retardation device 42 which is designed to compensate for ellipticity introduced into the beam of polarized light by the specimen. Any device may be employed which is of such character that substantially equal compensation is obtained over the full aperture of the optical system with which it is used. We have had considerable success with an extremely thin mica plate mounted between glass cover plates. Phase retardation device 42 is supported in alignment with the optical axis and is normal to the axis besides being rotatable thereon. The mica plate which we employ is to be distinguished from the familiar quarter wave plate in that it is much thinner than the latter. This is due to the necessity for measuring small angles of phase difference and the requirement of a device which possesses that fine degree of sensitiveness made possible by using a very thin plate.

The phase retardation means 42, like the rotation compensating means 35, also has a position for zero setting. This position is taken as that wherein the fast axis of the mica plate will be in parallel relation to the plane of vibration of the illuminating beam as it emerges from the polarizer-analyzer 16 on its way to the compensator prism 35. Plane polarized light which is in other relation to the fast axis of the plate 42 will be converted into elliptical polarized light in its passage through the phase retardation device. Obviously, the ellipticity introduced into the illuminating beam will be dependent upon the orientation of the axes of the mica plate with respect to the plane of the polarized light and may be varied at will by rotating the plate about the optical axis of the instrument to different working positions.

After passage through the phase retardation device 42, the illuminating beam proceeds through suitable objective lenses 24 and 25 located above the device 42 and below an object or specimen 26 carried on a suitable support 27 which latter is mounted for rotation about the optical axis. Lenses 24 and 25 direct the illuminating beam onto the object 26 which reflects the beam and returns it as the reflected beam through the objective lenses, the phase retardation means 42 and the rotation compensating means 35 to the illuminator prism 16 which it re-enters.

It will be apparent that the just foregoing description defines a polarizing illuminating system of the full aperture type, in that the illuminating beam is passed through the entire opening of the illuminating prism 16 and of the objective 24, 25 to reach the specimen and after its reflection by the specimen is passed back through the entire opening of the objective and of the illuminating prism before it is directed towards the viewing means associated with the instrument. A system of this character is to be distinguished from a semi-aperture type of system, such as that shown in U. S. Patents 2,128,394 and 2,192,295 issued to Max Berek, wherein the polarized illuminating beam which emerges from the illuminator prism is, after reflection by the specimen, passed around the illuminator prism to the viewing means of the system and does not re-enter the illuminator prism.

In other words, a full aperture illuminating system sends an axially symmetrical bundle of rays toward the object, intercepts this axially symmetrical bundle of rays on its return from the object and directs it toward the viewing means. On the other hand, a semi-aperture type of illuminating system directs an axially displaced beam toward the object and results in an axially displaced reflected beam.

The advantage of the full aperture type of polarizing vertical illuminator lies in the fact that the central rays of both the illuminating beam and the reflected beam are substantially perpendicular to the plane of the specimen, whereas in the semi-aperture type of illuminator, this condition is not fulfilled. Since the polarization effects of opaque materials vary with the angle of incidence, it is apparent that a system which enables one to employ axially symmetrical bundle of rays possesses an advantage over one which fails to do so.

The aperture of an illuminating system like that of Figure 1 is determined by the aperture of the objective used therewith. Since it is generally desirable, as will be well understood by the art, to stop down the illuminating system when conducting observations, the term working aperture is employed herein to designate any aperture found suitable and which is equal to or less than the numerical aperture of the objective.

The reflected beam returned from a birefringent specimen to the polarizer-analyzer prism 16 will be broken up into vibration components which are parallel to the preferred directions in the prism 16. By reason of its design, the prism 16 will always transmit the extraordinary ray through the interface 19. Hence, the component of the reflected beam which is parallel to the extraordinary vibration direction will be passed through the prism 16 and out of the end 21 thereof where it will be lost. On the other hand, the component of the reflected illuminating beam which is parallel to the ordinary vibration direction in the prism 16 will be reflected at the interface 19 thereof to the surface 28 which latter is silvered and inclined at such an angle that this component will be reflected in a direction which is normal to the optical axis of the instrument to pass through the side 22 of this prism.

Either a camera 29, with lens 30, or an ocular system are removably interposed in the path of the ordinary ray or component emerging through the side of the prism 16. Both the viewing means and the camera means are adapted to focus on the image plane of the objective when they are inserted in the optical system. The ocular system, as shown in the drawing, employs a prism 31 to direct light through the eye lenses 32 and 33 and diaphragm 34.

If it is now assumed that both compensating means are at their compensating position for an anisotropic specimen, the reflected beam will be returned from the compensator prism 35 to the illuminator prism 16 as plane polarized light. This light is vibrating in the same azimuth as the illuminating beam transmitted by the prism 16 or in other words it will be parallel to the extraordinary vibration direction in that prism. The reflected beam will hence pass through the end 21 of the prism 16 and will be lost. Thus upon compensation of the beam, it will be apparent that the field of view through the ocular system will appear dark since substantially all of the reflected beam will be lost to the eye lenses 32 and 33.

By way of tracing the effects on the illuminating beam of the compensation for an anisotropic specimen, it may be noted that the compensator prism 35 when in its compensating position will rotate the plane of polarization of the illuminating beam emergent from the polarizer-analyzer 16 while the phase retardation means 42 will convert the ascending illuminating beam into elliptical polarized light. The effect of reflection by the birefringent object 26 is to introduce further ellipticity, leaving the reflected beam elliptically polarized but with reversed direction of vibration. Also, the specimen will introduce a rotation of the vibration opposite to that introduced by the compensator prism 35.

When the beam again passes through the phase retardation means 42 it is reconverted into plane polarized light due to the phase difference compensation by the mica plate at the compensation setting. While the reflected beam is thus made plane polarized, its azimuth is not parallel to that of the illuminating beam transmitted by the prism 16. However, as the reflected beam passes through the compensator prism 35, its plane of polarization will be swung to a position which is parallel to that of the illuminating beam transmitted by prism 16 to enter the latter in compensated condition.

It has been noted that a portion 41 of the illuminating beam is lost in the compensator prism 35 at the surface layer 38. When the illuminating beam is returned by reflection from the specimen to the compensator prism, another portion 43 thereof, as shown in Figure 2, is also lost by reflection from the layer 38. Light losses by reflection from the layer 38 while at the expense of the intensity of the field of view are of insufficient magnitudes to interfere with the precision measuring function of the instrument.

Our invention is not limited to a construction wherein the objective, shown as formed of the lenses 24 and 25, is located between the elliptical compensating means 42 and the object 26. Any location on the optical axis between the illuminator prism 16 and the object 26 may be selected for the objective, its position in this regard being immaterial, as will be well understood to those skilled in the art. In fact, the objective may be located between the illuminator prism 16 and either the ocular or the camera means of the instrument.

In the operation of the instrument to determine optical characteristics of a specimen, it is first necessary to position the compensator prism 35 and the mica plate 42 at their respective zero settings. Where these two compensating means are carried in a single housing which is adapted to be removably mounted in the optical system, the zero setting should be located each time the housing is inserted in operating position. This is readily accomplished by the use of an isotropic specimen, for example, a stellite mirror. With an isotropic specimen mounted on the support 26, the rotation compensating means 35 and the elliptical compensating means 42 are alternately rotated until the image appears darkest. This procedure will determine the positions at which both compensating means will be in their zero setting.

An anisotropic specimen, concerning which information is desired, is now substituted for the isotropic specimen and with both compensating means in their respective zero setting, the support 26 is rotated until the specimen appears darkest. This procedure will orient the preferred directions of the specimen parallel with those of the elliptical compensating means and the rotation compensating means. The most favorable position of analysis for the specimen is, however, generally 45° from this position of orientation. Hence the support 26 is rotated 45° from its setting for orienting the specimen undergoing analysis.

Rotation of the support 26 for this purpose may be in either direction. It is to be noted, however, that formulae used to derive the bi-reflectance and the phase difference of the specimen from measurements taken with the compensating means will employ a certain sign convention and the directions of rotations should be in keeping with such convention, as will be well understood by the art.

With the anisotropic specimen located as just described, the rotation compensating means and the elliptical compensating means are again alternately rotated until the specimen appears darkest. Suitable scales are associated with both of these compensating means so that the angles through which they are rotated from their respective zero setting may be determined. These angles are functions of the phase difference and the bi-reflectance of the specimen as well as the optical constants of the mica plate 42 and the compensator prism 35. The angles found from the rotation of the two compensating means are employed to determine such optical constants of the specimen as its phase difference and its bi-reflectance.

When it is merely desired to observe the anisotropic specimen under polarized light, the rotation and the elliptical compensating means 35 and 42 may be removed from the optical system, although for general purposes of qualitative analysis it will be satisfactory to position each compensating means at its respective zero setting. In either case, the component of the reflected beam which is vibrating in a plane parallel to the ordinary ray developed by the prism 16, will be directed to the ocular system or the camera means already described.

We have found it desirable, for the purpose of increasing contrast of the system, to provide the end 39 of the compensator prism 35 and the parallel surfaces of the cover plates of the phase retardation means 42 with suitable transmission or anti-reflection films (not shown in the drawing). The transmission films may be formed by an evaporation process or by chemical leaching treatment. While films of this character are preferably of one quarter wavelength in optical thickness, they are to be distinguished from the layer 38, in that they are normal to the incident beam and function to increase the contrast in the optical system by decreasing light lost by reflection from the surfaces to which these films are applied.

While Figure 1 discloses the optical system of the instrument as arranged below the object support 27, a construction whereby the system is located above the support is comprehended by the invention. For that matter, any spatial arrangement of the optical system and the different elements thereof which will permit operation of the instrument will fall within the scope of our invention.

Our inventive concept extends beyond the specific optical system and vertical illuminator disclosed in the drawing. For example, the invention comprehends the use of separate polarizing and analyzing means of conventional design in the system shown in Figure 1. It will also be appreciated that any well known separate polarizing and analyzing means may be substituted for the prism 16 with the polarizing means located on one side of the specimen support 27 and the analyzing means located on the other side of the support. This latter expedient provides a system which is especially adaptable for use with transparent objects about which, as already pointed out, information is best obtained by study of a beam transmitted therethrough rather than by study of a reflected beam.

In instances where it is only desired to compensate for rotation of the plane of polarization, it will be appreciated that the phase retardation means 42 may be set at its zero position or may be dispensed with entirely.

It will also be understood that prism means 35 is not limited to employment for the particular purposes which we have disclosed. For example, it will be appreciated that prism means 35 may be associated with many different types of optical systems to serve as a beam splitter which is capable of dividing either a polarized or an unpolarized light beam into desired transmitted and reflected portions upon suitable selection of the constants which control the ability of this prism means to reflect and transmit incident light. Similarly, the scope of the invention includes the use of the prism means 35 as a half-shade device by nearly apply the reflectance layer 38 to a portion of the interface between the prism elements 36 and 37, for example, to the area of the interface which lies on either side of the transverse axis of these prism means. Further, the use of such prism means as a partial or incomplete polarizer is inclined in the scope of this invention.

From the foregoing, it will be appreciated that we have accomplished the aims and objects of our invention, in that we have provided a novel instrument and optical system therefor to permit the examination of an object by polarized light. At the same time, we have devised compensating means of simple design and easy operation which allow fine and precise study of a specimen of an anisotropic nature through the use of a polarized beam of light which is either reflected by or transmitted through the specimen. As a result, we have provided an optical system capable of use for many purposes of analysis and with many different types of instruments.

We claim:

1. In an illuminating system used in the examination of an object which will reflect light, the combination of a source of unpolarized light, polarizing means intercepting light from said source and directing plane polarized light towards said object for illuminating the same, analyzing means intercepting light which is reflected from said object whereby to analyze the reflected light, means traversed by the light which illuminates said object and by the light reflected therefrom whereby to rotate in the same directional sense both the plane of polarization of the light which illuminates the object and the plane of polarization of the reflected light, and means traversed by the light which illuminates said object and by the light which is reflected therefrom whereby to introduce a phase retardation in said light, said rotation means and said phase retardation means being located between said polarizing means and said object and said analyzing means being located to intercept said reflected light after it has passed through said phase retardation means and said rotation means.

2. In a vertical illuminating system used in examining an object and characterized by having a full aperture polarizing illuminating prism of the type wherein polarized light emerging from the prism is directed onto an object aligned in perpendicular relation with the optical axis of the prism and wherein said light on reflection by said object is returned to said prism for analysis, the combination of means rotatably adjustable on said optical axis and traversed by light which emerges from and which is returned to said prism for effecting a rotation of the plane of polarization whereby to compensate for any rotation of the plane of polarization caused by reflection from said object, and means rotatably adjustable on said axis and traversed by light which emerges from and which is returned to said prism for introducing a variable phase retardation in said light to compensate for any phase retardation introduced by reflection from said object, both of said compensating means located between said prism and said object and said rotation compensating means being characterized by rotating in the same directional sense both the plane of polarization of the light which emerges from and the plane of polarization of the light which is returned to said prism.

3. An optical system for the microscopic examination of an object which will reflect a beam of light employed to illuminate the object in a direction substantially opposite to the course of travel of the illuminating beam, said system comprising in combination a source of unpolarized light, a prism intercepting light from said source, said prism having means for polarizing light and for directing a beam of plane polarized light to illuminate said object, an objective interposed in the light path between the prism and the object, said prism also having analyzing means whereby polarized light which is returned to said prism and which is vibrating in a plane parallel to that of the illuminating beam is passed through said prism and lost from said system while light which is vibrating in a plane normal to that of the illuminating beam is directed by said prism to the image plane of said objective, means located between the prism and the object and traversed by said beams for rotating their planes of polarization, other means also located between the prism and the object and traversed by said beams for introducing a phase retardation in the beams, said means for effecting a rotation of the plane of polarization being characterized by causing polarized light which traverses the same in oppositely directed courses to be rotated in the same directional sense, and a lens system focusable on said image plane whereby to magnify an image of the object formed by light which passes through the objective and which is directed by said prism to said image plane.

4. In an optical system wherein plane polarized light which is directed towards an object to illuminate the same proceeds from said object towards analyzing means, the combination of means through which said light is passed for rotating the plane of polarization of said light, said rotating means comprising two prism elements of transparent material of substantially the same refractive index, each element having one face which intersects a second face at an acute angle, said acute angles being substantially equal and said elements having their respective first mentioned faces and second mentioned faces maintained in substantially parallel relation, a layer of transparent material interposed between and optically joined to the first mentioned faces of said elements, said layer having a refractive index different from that of said elements and a geometrical thickness substantially equal to one-quarter the wavelength of a component of light multiplied by the reciprocal of the product of the refractive index of the layer by the cosine of the angle of refraction in the layer, said rotation means being located in the path of said light to have the second mentioned faces of said elements substantially perpendicular to said path.

5. In an optical system for the examination of an object wherein plane polarized light is directed along the optical axis of the system to illuminate the object and wherein light proceeding along the optical axis from the object passes through means for analyzing polarized light, the combination of a rotation compensator and an elliptical compensator through which said light is passed prior to its analysis to correct for any rotation of the plane of polarization and any ellipticity introduced into said light by said object, said rotation compensator comprising two prism elements of transparent material of substantially similar refractive index, each element having one face which intersects a second face at an acute angle, said acute angles being substantially equal and said elements having their respective first mentioned and second mentioned faces maintained in substantially parallel relation, a layer of transparent material interposed between and optically joined to the first mentioned faces of said elements, said layer having a refractive index different from that of said elements and a geometrical thickness substantially equal to one-quarter the wavelength of some component of light multiplied by the reciprocal of the product of the refractive index of the layer by the cosine of the angle of refraction in the layer, said elements being rotatably adjustable as a unit about the optical axis and being interposed in the light path to have their second mentioned faces substantially perpendicular to said optical axis, and said elliptical compensator comprising a plate of birefringent material aligned with said rotation compensator and located so that the opposite faces of the plate are substantially perpendicular to said optical axis, said plate being adjustably rotatable about said optical axis.

6. An optical system for the microscopic examination of an object, said system comprising in combination a source of unpolarized light, polarizing means intercepting light from said source and directing plane polarized light towards said object to illuminate the same, an objective intercepting the polarized light proceeding from the object whereby to form an image of the object, a lens system focusable on the image plane of said objective whereby to direct light onto a receptor, analyzing means between the object and the receptor for analyzing light proceeding from the object, and means interposed in the polarized light between said polarizing means and the analyzing means for rotating the plane of polarization, said rotation means having two substantially similar wedge shaped transparent elements of substantially the same refractive index and a layer of refractive material which has a refractive index different from that of said elements and which has a geometrical thickness substantially equal to one-quarter the wavelength of a selected component of light multiplied by the reciprocal of the product of refractive index of the layer by the cosine of the angle of refraction in the layer, the layer being interposed between and optically joined to the hypotenuse faces of said elements and said rotation means being located in the path of said polarized light to have its hypotenuse faces inclined to said path and a pair of its parallel faces substantially perpendicular to said path.

JAMES R. BENFORD.
ARTHUR F. TURNER.